(12) United States Patent
Celani

(10) Patent No.: US 8,629,658 B1
(45) Date of Patent: Jan. 14, 2014

(54) METHOD AND SYSTEM FOR SOLAR PANEL PEAK-POWER TRANSFER USING INPUT VOLTAGE REGULATION

(75) Inventor: Jonathan Wayde Celani, Hudson, NH (US)

(73) Assignee: Linear Technology Corporation, Milpitas, CA (US)

( * ) Notice: Subject to any disclaimer, the term of this patent is extended or adjusted under 35 U.S.C. 154(b) by 718 days.

(21) Appl. No.: 12/645,241

(22) Filed: Dec. 22, 2009

(51) Int. Cl.
*H02J 7/04* (2006.01)
*H02J 7/06* (2006.01)

(52) U.S. Cl.
USPC .......................................... 320/140; 320/164

(58) Field of Classification Search
USPC ........................ 320/101, 144, 139, 140, 164
See application file for complete search history.

(56) References Cited

U.S. PATENT DOCUMENTS 5,870,296 A * 2/1999 Schaffer ........................... 363/65
5,932,994 A * 8/1999 Jo et al. ........................... 323/222
6,310,789 B1 * 10/2001 Nebrigic et al. ................. 363/60
8,004,917 B2 * 8/2011 Pan et al. ....................... 365/211
8,013,472 B2 * 9/2011 Adest et al. ...................... 307/77

* cited by examiner

*Primary Examiner* — Richard V Muralidar
(74) *Attorney, Agent, or Firm* — McDermott Will & Emery LLP

(57) ABSTRACT

An apparatus and method for charging a battery. The disclosed apparatus includes a battery to be charged, a power delivery path configured for delivering power to the battery, and an integrated switching battery charger configured for charging a battery by delivering output power to the battery via the power delivery path based on input power from an input power source. In the disclosed apparatus for charging a battery, the integrated switching battery charger includes an output voltage regulation loop and an input voltage regulation loop, both of which are configured to control the output current flowing out of the integrated switching battery charger to the battery. The input or output voltage regulation loops are further enhanced by adding a current source which is proportional to absolute temperature from the regulated voltage to the control voltage for the purpose of either regulating peak power from the source or to maximize energy storage in the battery as a function of temperature.

25 Claims, 15 Drawing Sheets

METHOD AND SYSTEM FOR SOLAR PANEL PEAK-POWER TRANSFER USING INPUT VOLTAGE REGULATION

BACKGROUND

1. Technical Field

The present teaching relates to method and system for batteries. More specifically, the present teaching relates to method and system for solar batteries and systems incorporating the same.

2. Discussion of Technical Background

In today's world, the level of energy consumption is ever increasing yet the sources of energy are limited. More and more often, solar energy is becoming an increasingly popular source of energy. To utilize solar energy, it is commonly known that a solar panel is used to acquire light energy and then transform the acquired light energy into power. Such generated power is often used to charge a battery which can then be used to provide power.

Each solar panel has an operating point at which maximum output power is produced. For a given amount of light energy, a solar panel has non-linear output electrical characteristics. As current drawn from the panel is increased, the panel output voltage falls monotonically. This is shown in FIG. 1, where the x-axis represents current drawn from a solar panel and the y-axis represents the voltage output from the solar panel. As can be seen, after the current drawn from the solar panel exceeds a maximum operating point, the output voltage from the solar panel drops drastically. For example, at 50% illumination level, when the current drawn exceeds 50 mA, the output voltage drops rapidly from 15 v to close to zero. Similarly, at 100% illumination level, when the current drawn exceeds 100 mA, the output voltage drops rapidly from 15 v to close to zero.

The power produced by a solar panel can be computed by multiplying its output voltage with its output current. Due to the above discussed behavior of a solar panel, it is known that, with respect to output power, the behavior of a solar panel can be approximated by a parabolic curve, as shown in FIG. 2. This plot shows that the output power is maximal when the drawn current reaches a certain point and after that, the output power drops significantly. For example, at 50% illumination level, as the current drawn increases, the output power increases. When the current drawn exceeds 50 mA, the output power drops rapidly from almost 700 mW to close to zero when the drawn current approaches 70 mA. Similarly, at 100% illumination level, as the current drawn increases, the output power increases accordingly. When the current drawn exceeds 100 mA, the output power drops rapidly from 1400 mW to close to zero when the drawn current approaches 130 mA.

If the current load on a solar panel is controlled so that the solar panel operates with a load corresponding to the maxima of the panel's output power characteristic for a given illumination level, the solar panel can produce the most power possible for the given illumination level. This is known as operating at a solar panel's maximum power point.

Various maximum power point tracking (MPPT) control schemes exist to operate a solar panel at its maximum efficiency. Many of these schemes directly monitor the output power of the panel, and continuously adjust the load current so that the maximum output power is maintained. These systems sweep the load on the solar panel while monitoring the output voltage and current of the panel. The monitored output voltage and current terms are multiplied throughout the sweep to determine the actual panel output power. When needed, the system will adjust the load so that the system can operate at the maximum achieved output power level.

Some prior art schemes further attempt to increase panel efficiency by continuously modifying the panel load while directly monitoring output power, and continuously adjusting the panel operating point to maintain maximum output power. These types of systems are usually complex and generally require a microprocessor for control. Thus, they are also expensive.

As discussed herein, when the solar panel output power is compared with solar panel output current, a parabolic characteristic is observed (FIG. 2). The parabolic curves with respect to different illumination levels are shifted and this is illustrated in FIG. 2. However, when solar panel output power is compared to solar panel output voltage, although a parabolic characteristic is also observed, the maxima of the power characteristics are relatively independent of illumination intensity. This is illustrated in FIG. 3. As seen there, no matter what the underlying illumination levels are, the peak performance point for both parabolic curves (corresponding to illumination levels 50% and 100%) remains the same (close to 15 v). Specific solar panels have a known relationship between output power capability and output voltage, and the maximum power voltage ($V_{MP}$) is generally a specified parameter for commercially available solar panels.

High-performance solar powered battery chargers are designed to maximize the efficiency of power transfer from a solar panel to a battery. Such battery chargers are almost exclusively built using some type of switching DC/DC converter, as the power transfer efficiency of a DC/DC converter far exceeds that of a linear converter. A switching DC/DC converter can be viewed as a power transfer device, transferring power from an input supply to a load. When a DC/DC converter is powered by a solar cell, as the power requirements of the DC/DC converter increases, the power output from the solar panel must similarly increase.

When a solar panel provides increased power and its output current rises, the panel output voltage falls. The specific voltage and current for a given power output characteristic follows that of the specific panel, which is similar in shape as those characteristics shown in FIGS. 1-3. The maximum power available is achieved by operating at the maximum power point of the panel, corresponding to panel operation at the maximum power output voltage ($V_{MP}$). If the power required by the DC/DC converter exceeds the power available from the solar panel, the panel voltage will fall lower than $V_{MP}$, at which point the output power begins to fall. As further reductions in panel output voltage cause further reductions in output power, the panel output voltage quickly collapses.

A switching battery charger is one where the battery charging current is generated by a DC/DC converter. Switching battery charger control techniques exist in the public domain that aim at improving solar panel operational efficiency. These techniques take advantage of the characteristic collapse in panel voltage when the load on the solar panel exceeds the available output power. These techniques commonly employ a hysteretic under-voltage lockout that disables the DC/DC converter when the solar panel collapses below a reference voltage ($V_{MP(REF)}$) and then re-enables the DC/DC converter once the panel voltage recovers to reach some voltage above that reference. One example of such a circuit is shown in FIG. 4(a).

The battery charging circuit shown in FIG. 4(a) comprises a switching battery charger 440, that provides an output current based on a /SHDN input. When the /SHDN input is logic high, the battery charger operates normally, and provides a charging current (Iout) to battery 450. When the /SHDN input is logic low, the battery charger is disabled, and the output current Iout=0 A.

The /SHDN input is driven by a hysteretic comparator 420 that monitors the input voltage from an input power source to the switching charger 440. The input voltage corresponds to the solar panel output voltage when the power is supplied by a solar panel. The comparator 420 compares the input voltage with a comparator reference voltage 430. To approach maximum power transfer, the comparator reference 430 needs to be set close to the panel maximum power voltage (Vmp). When the solar panel voltage rises such that the positive input of the comparator exceeds the comparator voltage reference 430 (Vmp[ref]) by the comparator hysteresis voltage (Vhyst), the output of the comparator will be driven high, and the charger will be enabled.

If the input power required by the battery charger 440 is greater than the output power available from the solar panel, the panel will be loaded beyond it's maximum power level, and the voltage on the panel will collapse. Once the panel voltage falls below Vmp[ref]-Vhyst, the comparator output will be driven logic low, and the battery charger will be disabled. This subsequently removes the loads on the solar panel, which allows the panel voltage to rise until Vmp[ref]+Vhyst is reached, wherein charger enable/disable cycle repeats. This control technique used in this prior art solution is an non-linear approach.

By setting the hysteretic thresholds within the bounds of normal converter operation, the output power delivered approaches the peak power available from the solar panel through pulse-width-modulation of the DC/DC converter input current. The greatest efficiency is possible by setting the hysteretic under-voltage thresholds as close to $V_{MP}$ as is practical. The solar panel output current is continuous due to integration by the converter input capacitance, but the panel operates at output voltages that are both below and above the maximum power voltage. This is shown in FIG. 4(b). Because of that, the efficiency of such approaches suffers.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

An integrated switching battery charger is disclosed. The present teaching is to provide a method and system that maximizes solar panel output power for charging a battery using a DC/DC switching converter, and does so in a fashion that allows continuous operation of the switching battery charger. The present teaching discloses a method and system that modulates the output power of a solar panel, and maintains the panel at a point of maximum power output, through modulation of the output power delivery of the switching battery charger.

The present teaching also discloses a method and system that modulates the output power delivery of a switching battery charger in response to the sensed switching battery charger input voltage, and thus provides a method and system for modulating the battery charger input power by virtue of the power transfer characteristics of a switching battery charger.

In addition, the present teaching facilitates a maximum power point tracking (MPPT) method/system by maintaining solar panel operation at the maximum power voltage, or $V_{MP}$, through incorporation of the aforesaid input voltage regulation approach, and through modulation of the output power delivery of a switching battery charger in response to the sensed battery charger input voltage. The present teaching also discloses a method/system for temperature compensation of the aformentioned maximum power voltage. Furthermore, the present teaching discloses methods such that the above disclosed aspects of the invention can be employed internally in a single integrated circuit.

These and other aspects of the present teaching are accomplished by providing an additional regulation path in an integrated switching battery charger control circuit that modulates the output current control of the battery charger, this regulation path referred to as the input voltage regulation loop. In some embodiments, the input voltage may be monitored through a simple resistor divider, and compared against a reference voltage, where the resistor divider acts as the programming means to define the solar panel maximum power voltage, or $V_{MP}$.

In accordance with the present teaching, the input voltage regulation loop affects the output current control of the switching battery charger unidirectionally. In this manner, input voltages above the programmed $V_{MP}$ level will have no effect on the battery charger output current capability. As required battery charger input power approaches the maximum power available from the solar panel, the solar panel voltage will droop toward the programmed $V_{MP}$ voltage. As the solar panel voltage, monitored through the programming resistor divider, approaches the programmed $V_{MP}$ voltage, the battery charger output current is reduced, subsequently reducing the load on the solar panel so that the solar panel output voltage servos to $V_{MP}$, resulting in maximum power transfer from the solar panel.

Figure 1:
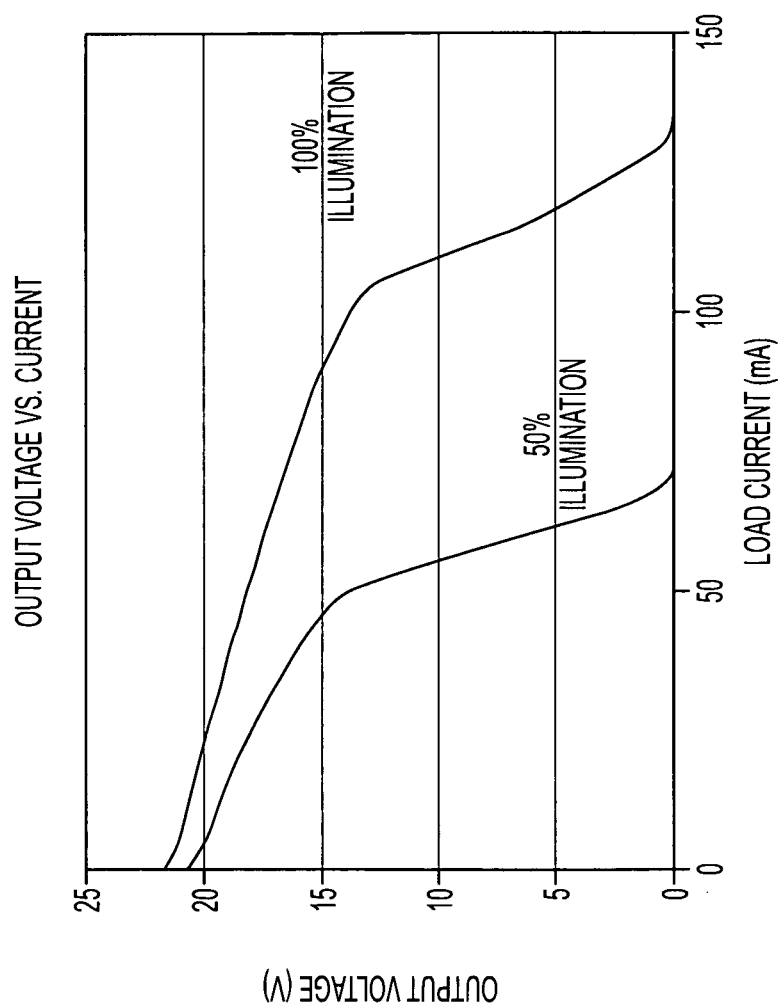
FIGS. 1-3 show different plots representing characteristic behavior of a solar panel performance.
Figure 2:
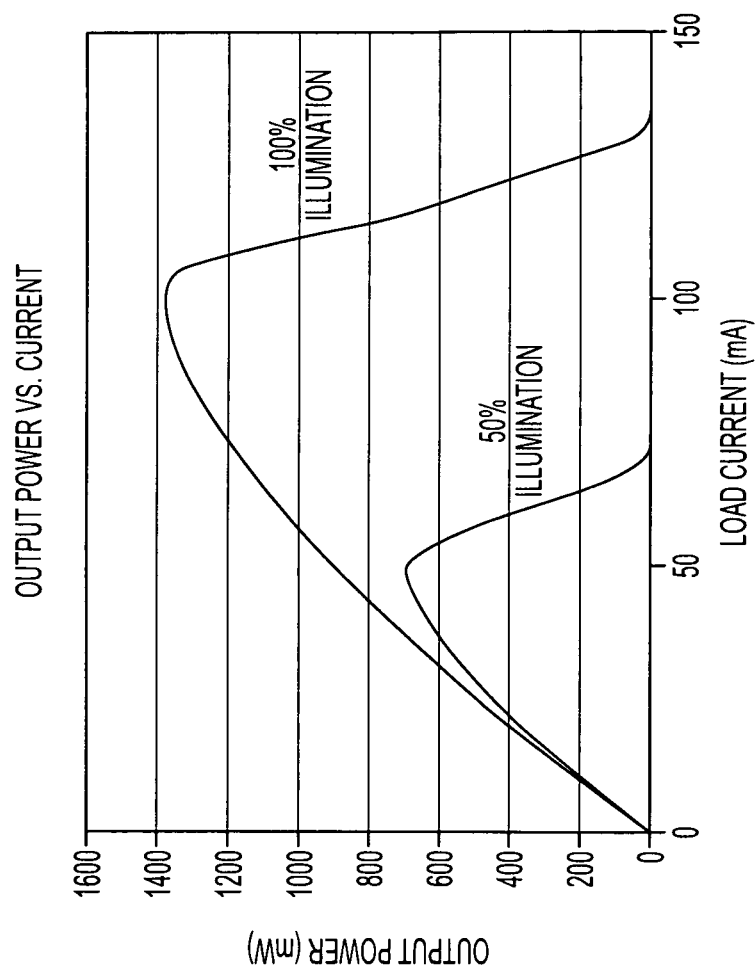
Figure 3:
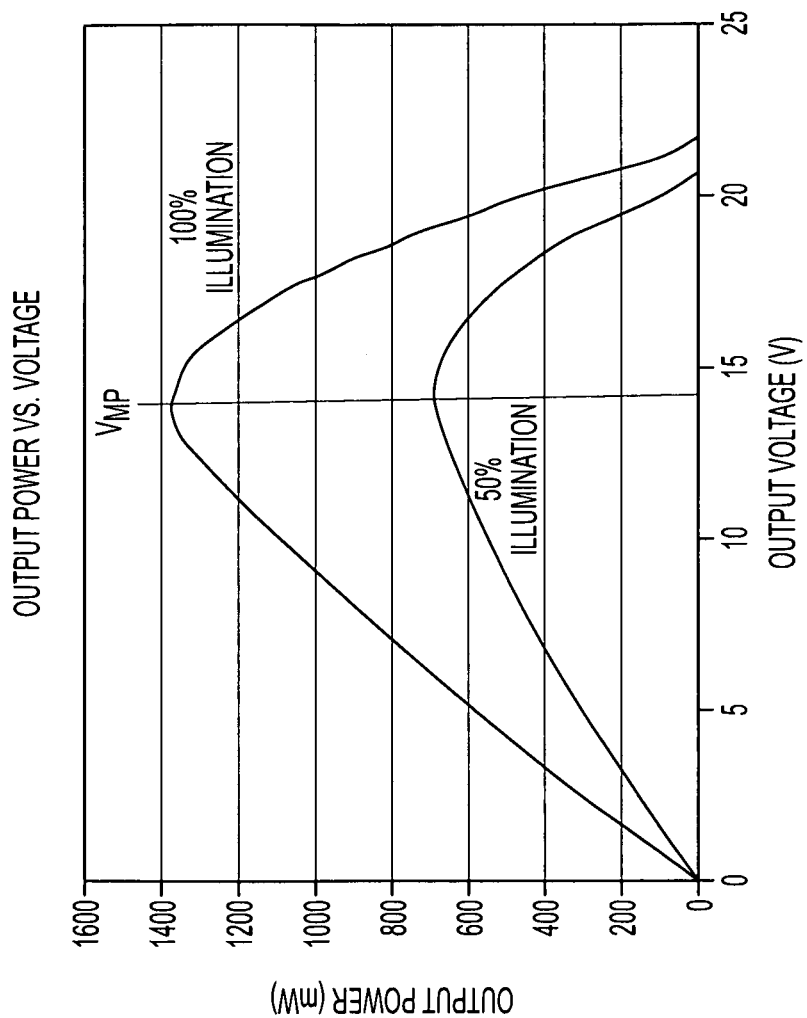
Figure 4A:
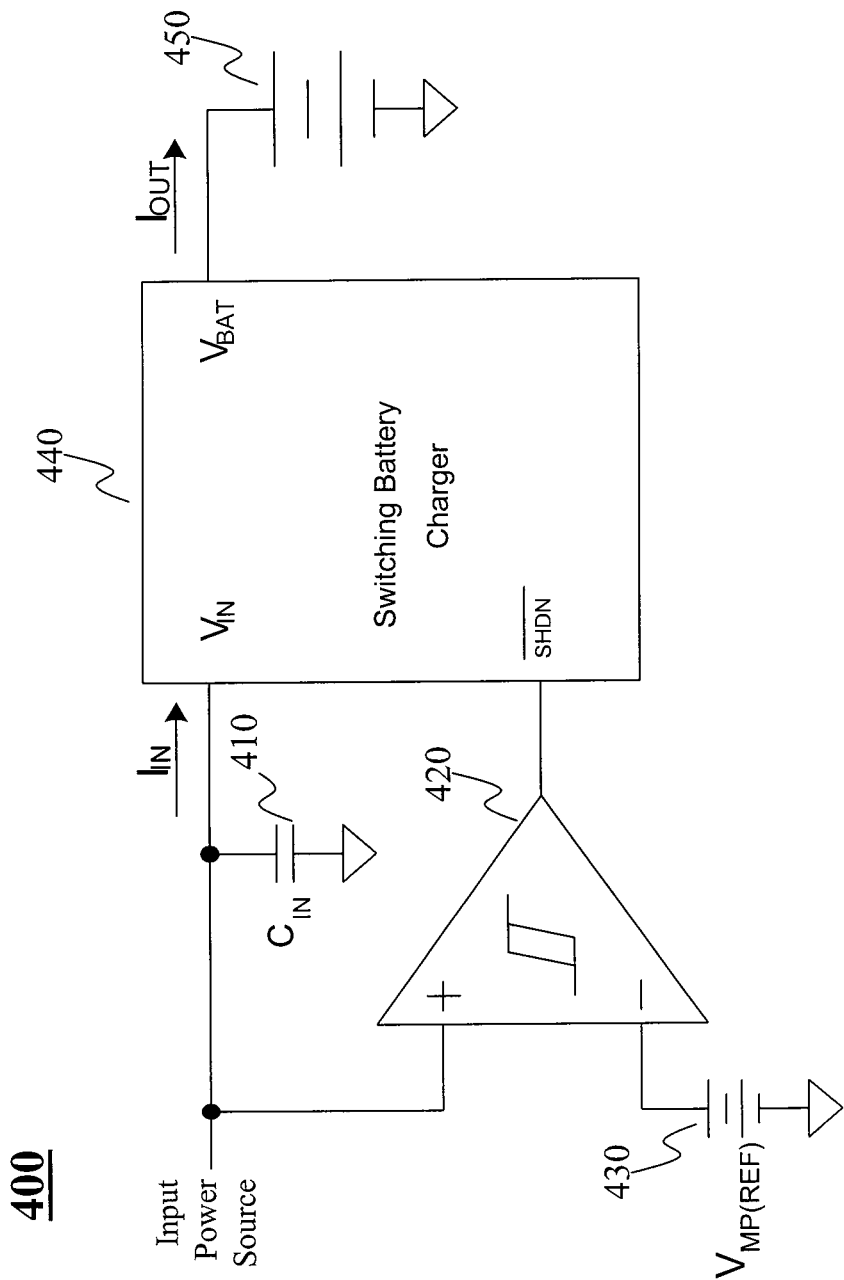
FIG. 4(a) (Prior Art) illustrates the system diagram of a conventional switching battery charger circuit for improving solar panel operational efficiency.
Figure 4B:
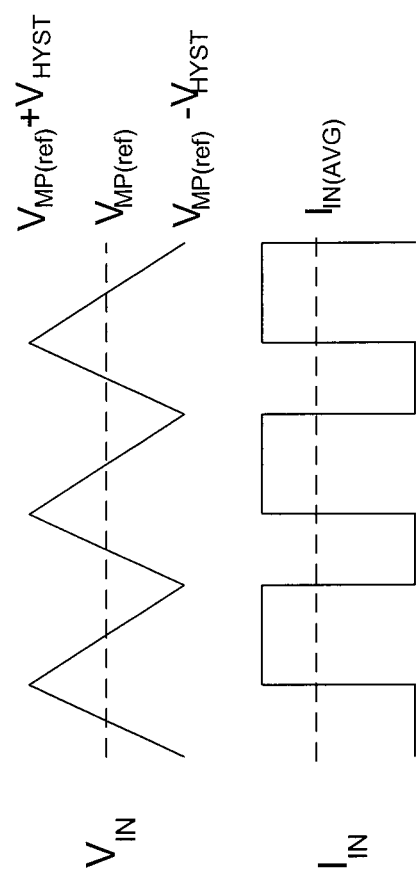
FIG. 4(b) shows the operating voltage and current waves corresponding to the system diagram in FIG. 4(a)
Figure 5A:
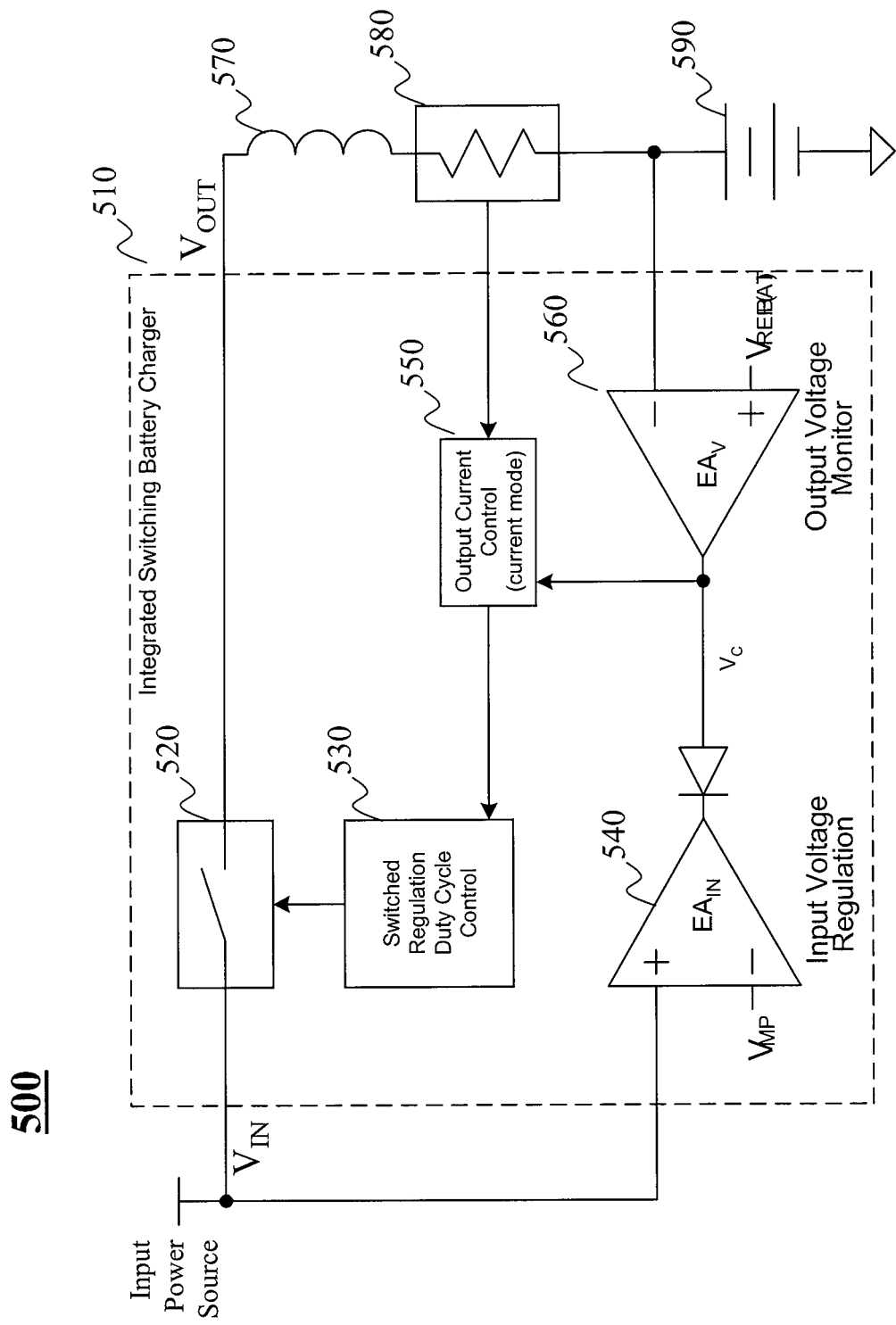
FIG. 5(a) depicts a block diagram of an exemplary integrated switching battery charger with input voltage regulation capability, according to an embodiment of the present teaching.
Figure 5B:
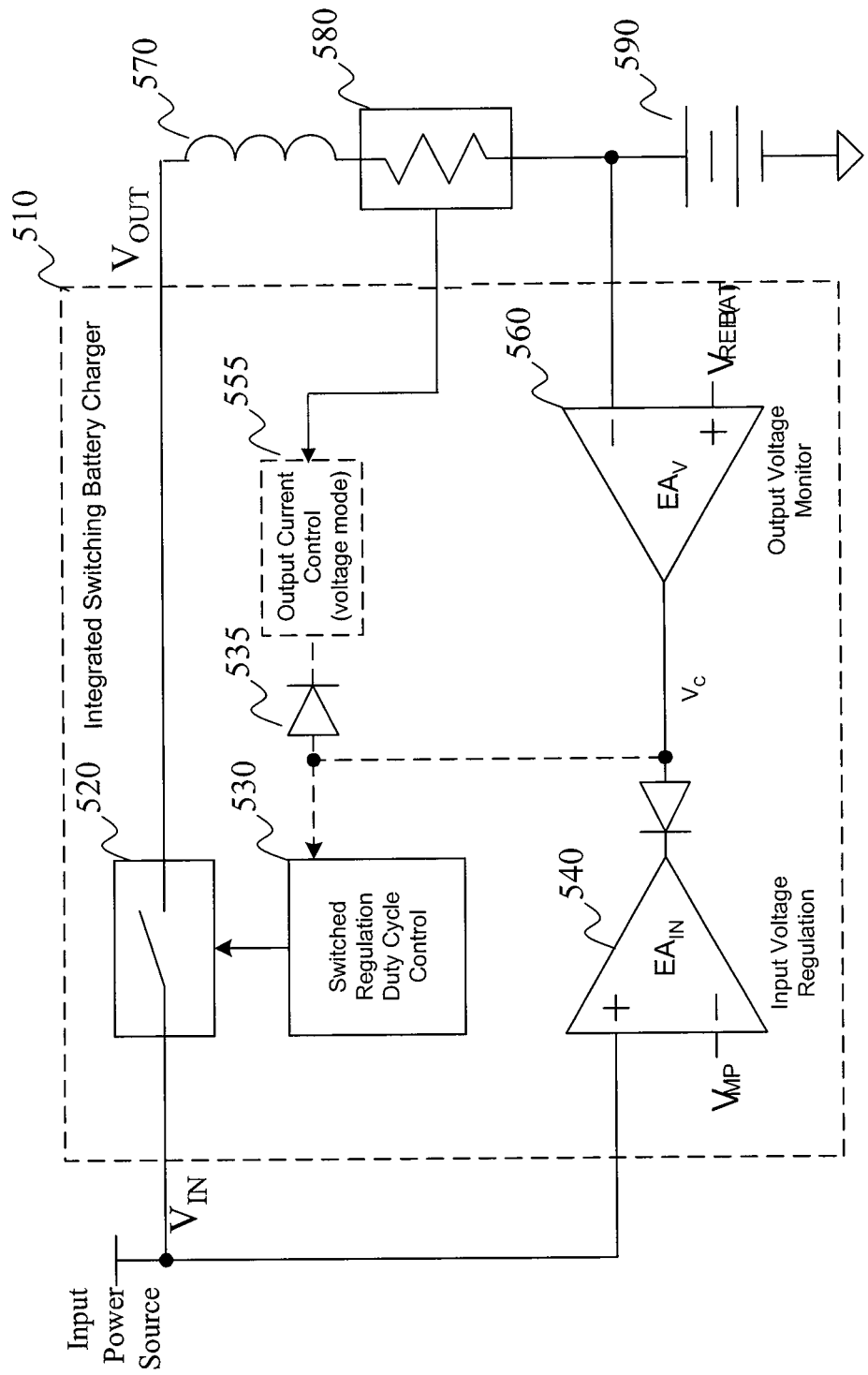
FIG. 5(b) depicts a block diagram of another exemplary integrated switching battery charger with input voltage regulation capability, according to an embodiment of the present teaching.

FIGS. 5(a) and 5(b) depict block diagrams of exemplary systems for integrated switching battery charger circuits with input voltage regulation capability, according to an embodiment of the present teaching. Specifically, FIG. 5(a) is a block diagram of an exemplary system for an integrated switching battery charger circuit 500 designed for current mode operation and FIG. 5(b) is a block diagram of an exemplary system for an integrated switching battery charger circuit 505 designed for voltage mode operation. Although the disclosed embodiments and discussion thereof center around a buck mode converter that steps down voltage, the essence of the present teaching is applicable to other converter types as well.

Circuit 500 in FIG. 5(a) comprises an integrated switching battery charger 510, an inductor 570, a current sensing circuit 580, and a battery 590. The integrated switching battery charger 510 takes an input $V_{IN}$ and provides an output voltage $V_{OUT}$. The switching battery charger 510 aims at what a conventional switching battery charger tries to achieve and operates in a manner so that the output current and output voltage are controlled through regulation and, ultimately, provide a controlled maximum charging current into the battery 590 until the battery voltage approaches a predefined voltage, at which time the charging current is reduced until the battery is fully charged.

The integrated switching battery charger 510 in FIG. 5(a), however, employs a regulation loop that monitors the voltage of the input supply (in addition to the conventional approach to monitor the output). This is referred to as the input voltage regulation loop. Specifically, the integrated switching battery charger 510 comprises an output voltage monitor 560, an output current control circuit 550, a duty-cycle control circuit 530, a switching element 520, and an input voltage regulation circuit 540. While conventional switching battery chargers mostly include the first four of the circuit elements (i.e., 560, 550, 530, and 520), the interconnect, specific circuitry, and control schemes vary depending on topology and/or switching charger type. The circuit 510 incorporates an additional control based on input voltage regulation and this is achieved via the input voltage regulation circuit 540 and its connections with other elements in circuit 510.

In a typical switching battery charger, the output voltage monitor ($EA_V$) 560 amplifies the difference between the charging battery voltage (the negative input to the output voltage monitor 560) and an internal reference voltage, $V_{REF(BAT)}$ (the positive input to the output voltage monitor 560). The output of the output voltage monitor 560, $V_C$, is then sent to the output current control circuit 550, which controls the maximum current permitted as per the output current control circuit 550. The maximum current controlled via the output current control circuit 550 then controls the switched regulation duty cycle control circuit 530 to generate an appropriate duty cycle which is output to the switching element 520, which controls the current flowing out of the integrated switching battery charger 510 and flowing into the battery 590.

It is noted that in the current-mode circuit 500, voltage $V_C$ does not directly control the switch duty-cycle. Instead, it is used to control the maximum current permitted as per the output current monitor circuit 550. In addition, in the current mode, the output current control circuit 550 controls the switch element duty-cycle. In operation, in accordance with the present teaching, the output current of the integrated switching battery charger 510 is controlled by both the output voltage monitor 560 and the input voltage regulation circuit 540. In general, the output current of the integrated switching battery charger 510 is reduced by reducing the voltage on $V_C$, via either the output voltage monitor 560 or the input voltage regulation circuit 540.

The core of the invention is the addition and integration of the input voltage regulation amplifier ($EA_{IN}$) 540, as pictured in FIG. 5(a). The input voltage regulation amplifier 540 takes the desired maximum power regulation voltage, or $V_{MP}$, on its positive input terminal and the input voltage from the input power source on its positive input terminal. Here, $V_{MP}$ is a solar panel specific parameter, which is programmed for each solar panel. The input regulation circuit 540 operates by amplifying the difference between the input voltage (from the input power source) and $V_{MP}$ and imposing the amplified difference on the charge current control node $V_C$. The effect is to reduce the voltage on $V_C$ and such an effect is usually unidirectional, i.e., the output of the input voltage regulation circuit 540 can only reduce the voltage on $V_C$, subsequently reducing the output current of the integrated battery charger. As such, when the solar panel voltage approaches $V_{MP}$, the voltage on $V_C$ is pulled lower, reducing the amount of current output to battery 590.

In operation, when the input power needed by the battery charger exceeds the available input power from the solar panel, the input voltage regulation circuit 540 acts by linearly reducing the current delivered to the battery in response to detection of the solar panel voltage dropping toward $V_{MP}$. This reaction of the input voltage regulation circuit 540 subsequently reduces the input power requirements of the charger. This linear reduction of output charge current operates in a closed-loop fashion so that the operating point of the charger servos until the input power requirements of the charger equal the maximum output capability of the solar panel, as is delivered when the solar panel voltage equals the programmed $V_{MP}$, which then achieves maximum power transfer from the solar panel.

The integrated switching battery charger circuit 505 is designed for voltage mode operation, in which, the outputs of the output voltage monitor 560 and the input voltage regulation circuit 540 are similarly coupled together, as in circuit 500. Each of them operates in a similar fashion as in circuit 500. However, the voltage $V_C$ on the charge current control node, controlled either by the output voltage monitor 560 or by the input voltage regulation circuit 540, directly controls the duty-cycle of the switch element. In this mode of control, when the battery voltage is below the regulation voltage, or $V_{REF(BAT)}$, the output voltage monitor 560 amplifies the difference and at its output, raises the $V_C$ voltage at the charge current control node. As can be seen from the circuit 505, the raised $V_C$ voltage is sent to the switched regulation duty cycle control circuit 530 directly to increase the switch duty-cycle.

In this exemplary circuit 505, the output current control circuit 555 is designed to prevent the current flowing through resistor 580 from exceeding a maximum output current level. If excessive current flowing through resistor 580 is detected, the output current control circuit 555 pulls down the $V_C$ voltage on the charge current control node so that the switched regulation duty cycle control circuit 530 then servos to maintain the maximum output current.

Figure 6A:
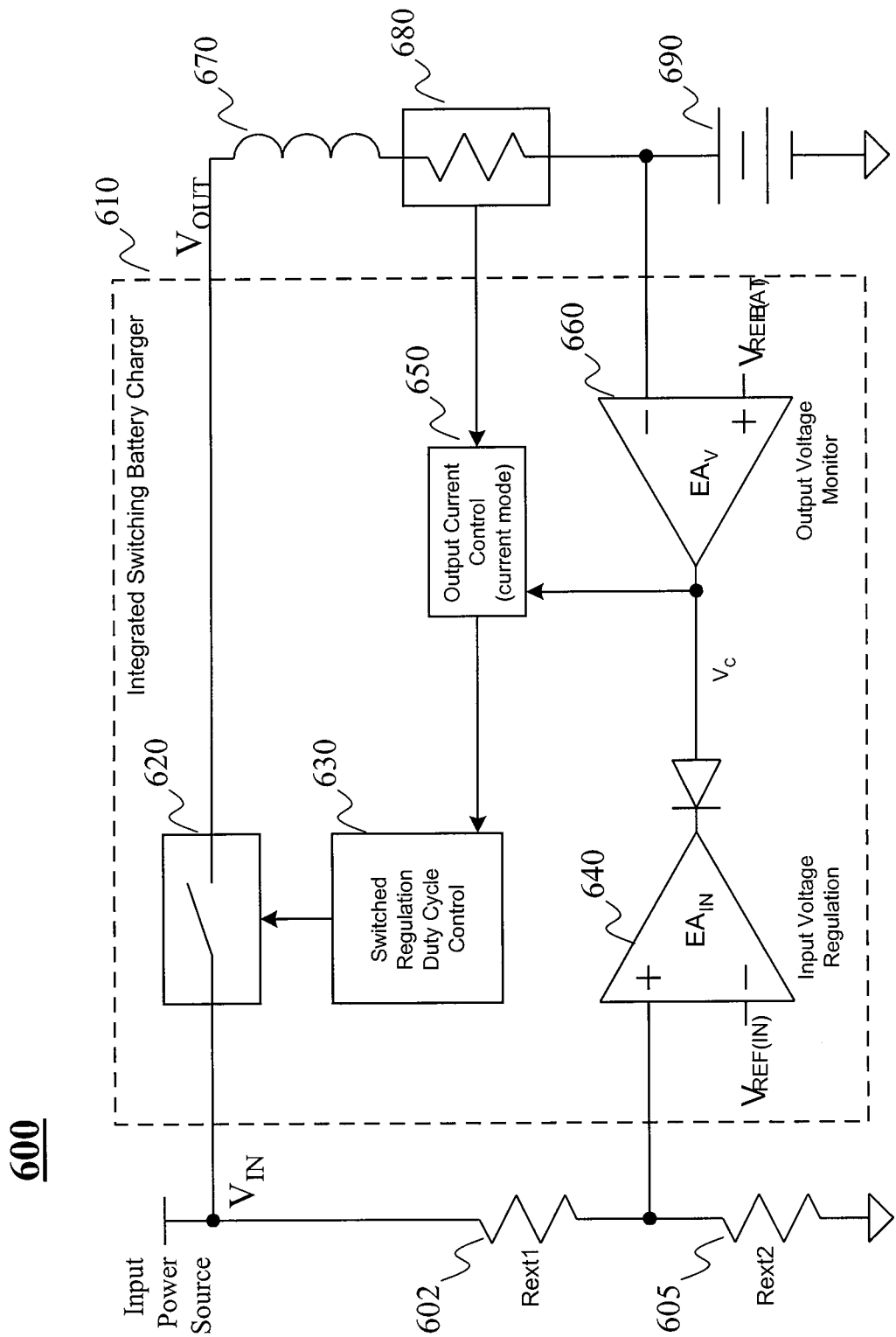
FIG. 6(a) depicts a block diagram of an exemplary integrated switching battery charger with input voltage regulation and internal low-voltage reference facilities, according to an embodiment of the present teaching.
Figure 6B:
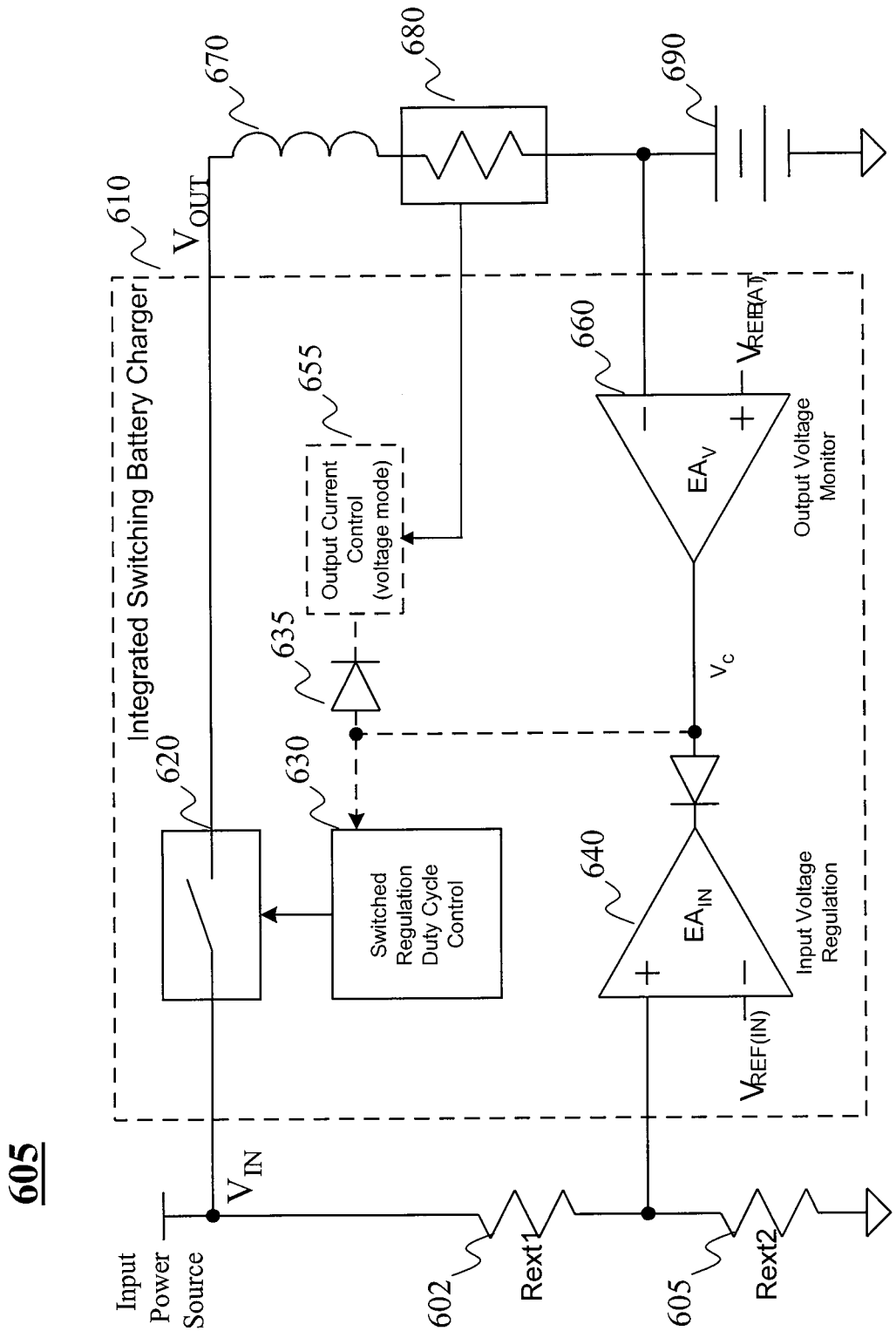
FIG. 6(b) depicts a block diagram of another exemplary integrated switching battery charger with input voltage regulation and internal low-voltage reference facilities, according to an embodiment of the present teaching.

It is understood that implementation of the integrated switching battery charger with input voltage regulation capability may take many forms. Different embodiments of such implementation are provided herein merely as illustration rather than limitation. For example, specific desired maximum power regulation voltage may be instead programmed using an external resistor divider. This is illustrated in FIGS. 6(a) and 6(b), where all other circuit elements remain the same (as in FIGS. 5(a) and 5(b), respectively) except an external resistor divider, comprising resistors 602 and 605, designed to provide a scaled desired maximum power regulation voltage to the positive input terminal of the input voltage regulation circuit 640. In this case, the reference input voltage, connected to the negative input terminal of the input voltage regulation circuit, is also scaled, in proportion, from $V_{MP}$ to an internal low-voltage reference $V_{REF(IN)}$. The use of such a resistor divider to program $V_{MP}$ provides the flexibility to manipulate the effective reference voltage based on needs.

When this arrangement is used, the resistor values in the divider are so determined that the output of the resistor divider is equivalent to the internal reference, $V_{REF(IN)}$, when the solar panel voltage is $V_{MP}$. The desired maximum power voltage, $V_{MP}$, can be programmed by setting the ratio of the external resistors Rext1 and Rext2 to be:

$$Rext1/Rext2 = (V_{MP}/V_{REF(IN)}) - 1$$

In this arrangement, when the solar panel voltage approaches Vmp, wherein the resistor divider output approaches $V_{REF(IN)}$, the input voltage regulation circuit 640 pulls voltage $V_C$ on the charging current control node lower, which controls the output current control circuit 650 (in a current mode) to make the switched regulation duty cycle control circuit 630 reduce the duty cycle, and subsequently the amount of current output to the battery. In a voltage mode as shown in FIG. 6(b), the voltage $V_C$ on the charging current control node is pulled down directly, which affects the duty cycle and, hence, the output current to the battery 690. Similar to what is discussed with respect to FIGS. 5(a) and 5(b), the effect of the input voltage regulation circuit 640 is also unidirectional and the output of the input voltage regulation circuit 640 reduces the voltage on $V_C$.

Temperature Compensation

A typical solar panel comprises a plurality of serially connected cells, each of which may be a forward-biased p-n junction. As such, the voltage across a single solar cell may have a temperature coefficient that is similar to a common p-n diode, or about −2 mV/° C. Generally, given that a solar panel includes a large number of serially-connected cells, the temperature effects on the panel voltage can be significant. Therefore, a circuit that implements the present teaching may incorporate a solution to compensate for the impact of temperature variation.

Figure 7:
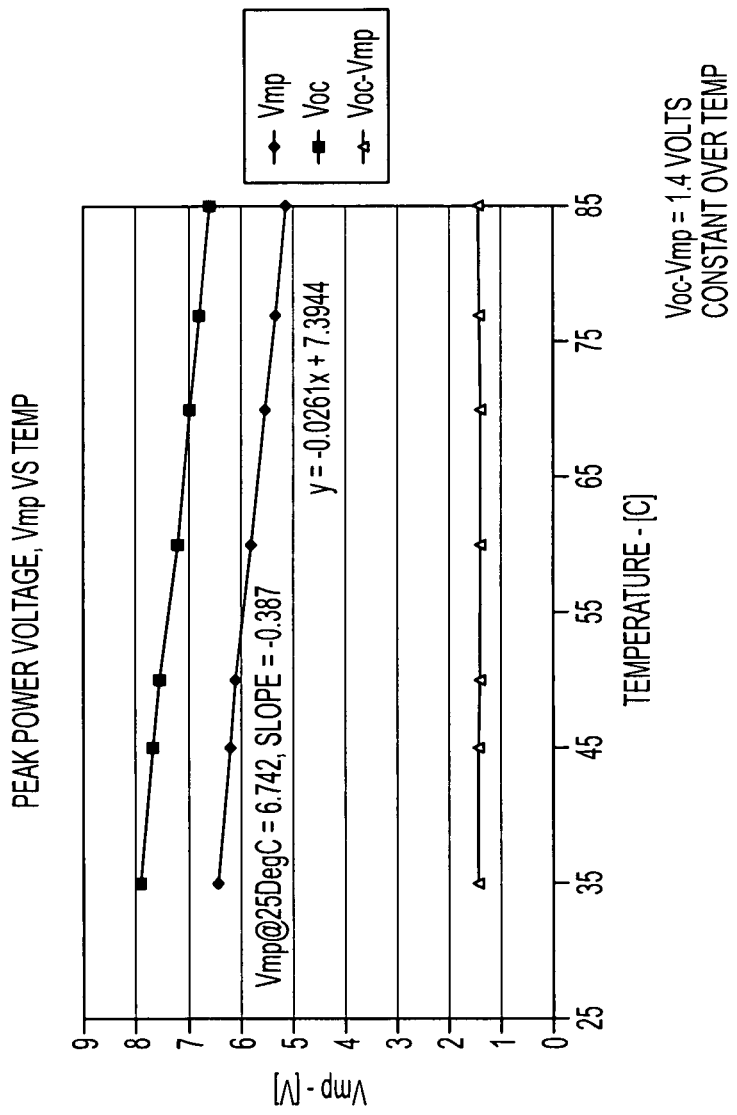
FIG. 7 illustrates the temperature characteristics of peak power voltage.

FIG. 7 shows the temperature characteristics of typical solar panels, where the peak power point, Vmp(T), follows the equation:

$$V_{MP}(T) = -0.0261*T + 7.3944 \text{ Volts}$$

where T is the Panel Temperature in Degrees Celsius. As can be seen in FIG. 7, when temperature goes up, the maximum power voltage $V_{MP}$, goes down.

As discussed above, the voltage characteristic of a solar panel is essentially that of a p-n diode and, hence, has a linear decrease with temperature of approximately 2 mV/° C. times the number of series cells. As such, the temperature change of a panel substantially affects the peak power voltage. Therefore, providing a simple and effective method for adjusting the peak power point as a function of temperature allows the end user to minimize the amount of solar material needed to power the application, which saves significant cost.

Prior methods for tracking the peak power point involve a microcontroller that dithers the load periodically to search for the peak power point or simply subtracts off a fixed value from the open circuit voltage. Both these methods involve complex circuitry. The one benefit to these prior methods over the proposed invention is that they do not require an actual temp sensor on the panel, as the peak power point is determined by the multiplication of the current and the voltage at the output terminals.

Solar panels are usually produced with a number of parameters specified by the manufacturer. Examples of such parameters include open-circuit voltage ($V_{OC}$), maximum power voltage ($V_{MP}$), and the temperature coefficient for $V_{OC}$. Some of those parameters may be provided with respect to a certain temperature level, e.g., 25° C. The temperature coefficient for $V_{MP}$ is generally equivalent to that for $V_{OC}$, and the temperature characteristic for $V_{MP}$ voltage is often highly linear. Observations of these properties may be utilized to derive a solution for temperature compensation of $V_{MP}$ for a given panel.

Figure 8:
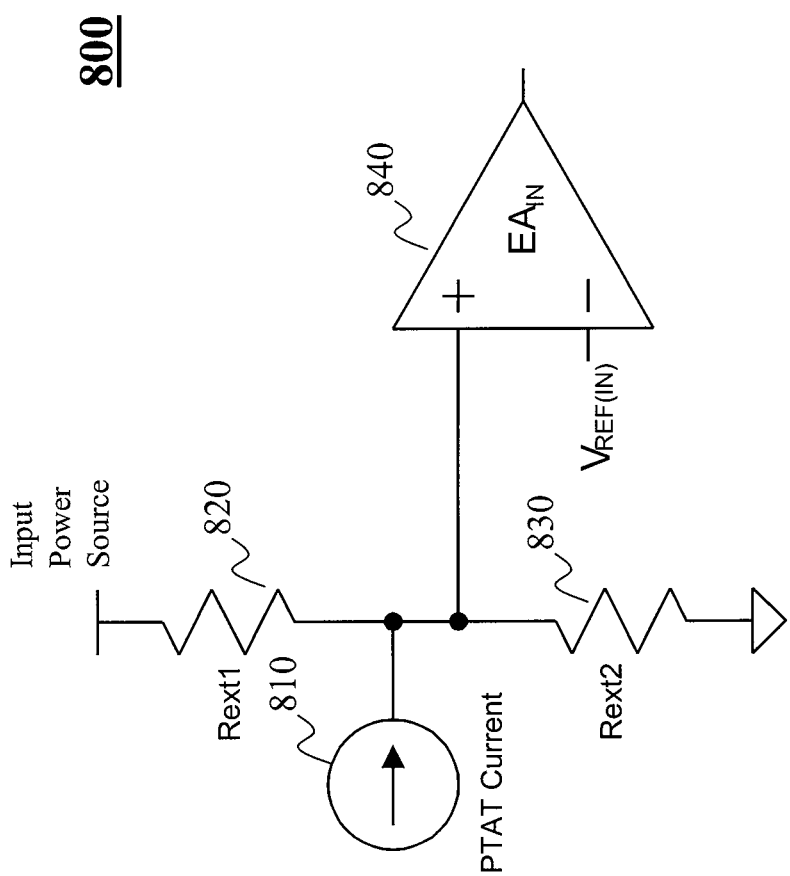
FIG. 8 depicts an exemplary circuit for peak power voltage temperature compensation, according to an embodiment of the present teaching.

To provide a solution, the temperature variation needs to be measured accurately. Temperature sensor ICs are commercially available that provide current that is proportional to absolute temperature (PTAT). Utilizing such commercially available instruments, an exemplary circuit 800 for peak power voltage temperature compensation is shown in FIG. 8. In this circuit, a PTAT current source 810 is employed on a solar panel to accurately monitor panel temperature. Such a PTAT current source can be realized using commercially available sensor ICs. The IC produces a current ($I_{PTAT}$) that is proportional to the panel temperature, which is then injected into the output of the resistor divider network used to program the input regulation loop. The resulting programmed voltage $V_{MP}(T)$ in this exemplary circuit 800 follows the following relation:

$$V_{MP}(T) = [(Rext1/Rext2)*V_{REF(IN)}Rext2] - (Rext1*I_{PTAT}(T))$$

The temperature coefficient is reflected via a simple two-element term (Rext1*$I_{PTAT}$(T)), simplifying programming the appropriate values for resistors Rext1 and Rext2, given specific characteristics of a PTAT current source in order to compensate for the temperature variation in the circuits as disclosed herein.

Figure 9:
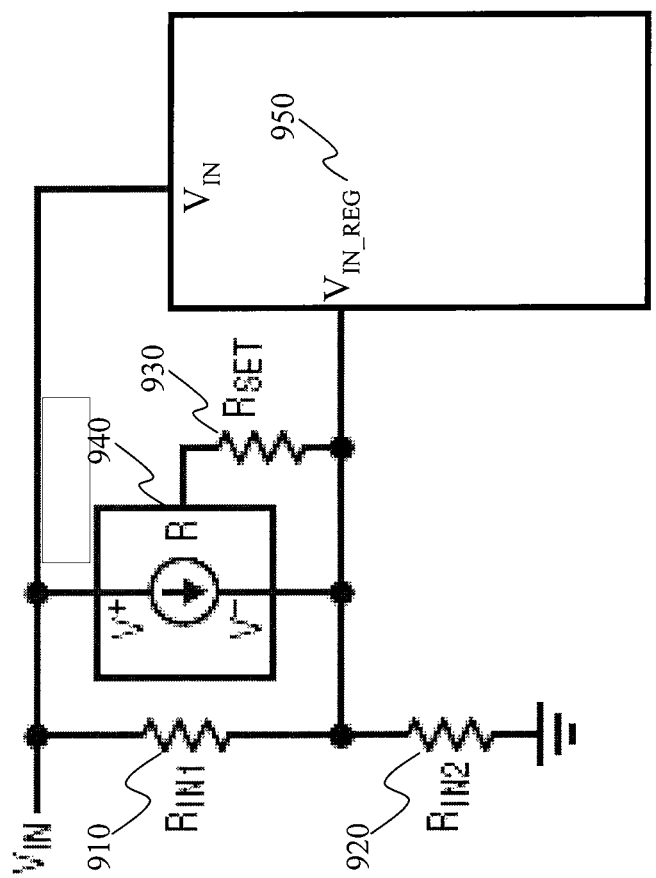
FIG. 9 depicts an exemplary circuit in which a current source is deployed to compensate regulation point of a regulation loop, according to an embodiment of the present teaching.

FIG. 9 shows an exemplary implementation of the current source to be added to the resistor divider to achieve temperature compensation, according to an embodiment of the present teaching. This additional PTAT current source to a voltage regulation loop is for the purposes of adjusting the regulation point to match a desired temperature characteristic. In this embodiment, the voltage regulation loop comprises a resistor divider including two resistors 910 and 920, a PTAT current source 940 coupled between input voltage $V_{IN}$ and the point where the two resistors 910 and 920 connect, and a resistor 930 coupled between the current source and where the two resistors 910 and 920 meet. This circuit produces a regulated input voltage $V_{IN\_REG}$ 950.

The PTAT current source, as illustrated in FIG. 9, is applied to the midpoint of the resistor divider, which is connected to the inverting input of the error amplifier. The PTAT current source adjusts the regulation point by sourcing a current which is proportion to the absolute temperature. The governing equations are:

$$R_{IN1} = -R_{SET} * (TC*4405)$$

$$R_{IN2} = R_{IN1}/(\{[V_{MP(25°\,C.)} + R_{IN1}*(0.0674/R_{SET})]/V_{IN\_REG}\} - 1)$$

where TC is the temperature coefficient (in V/° C.) and $V_{MP(25°\,C.)}$ is the maximum power voltage at 25° C.

Figure 10:
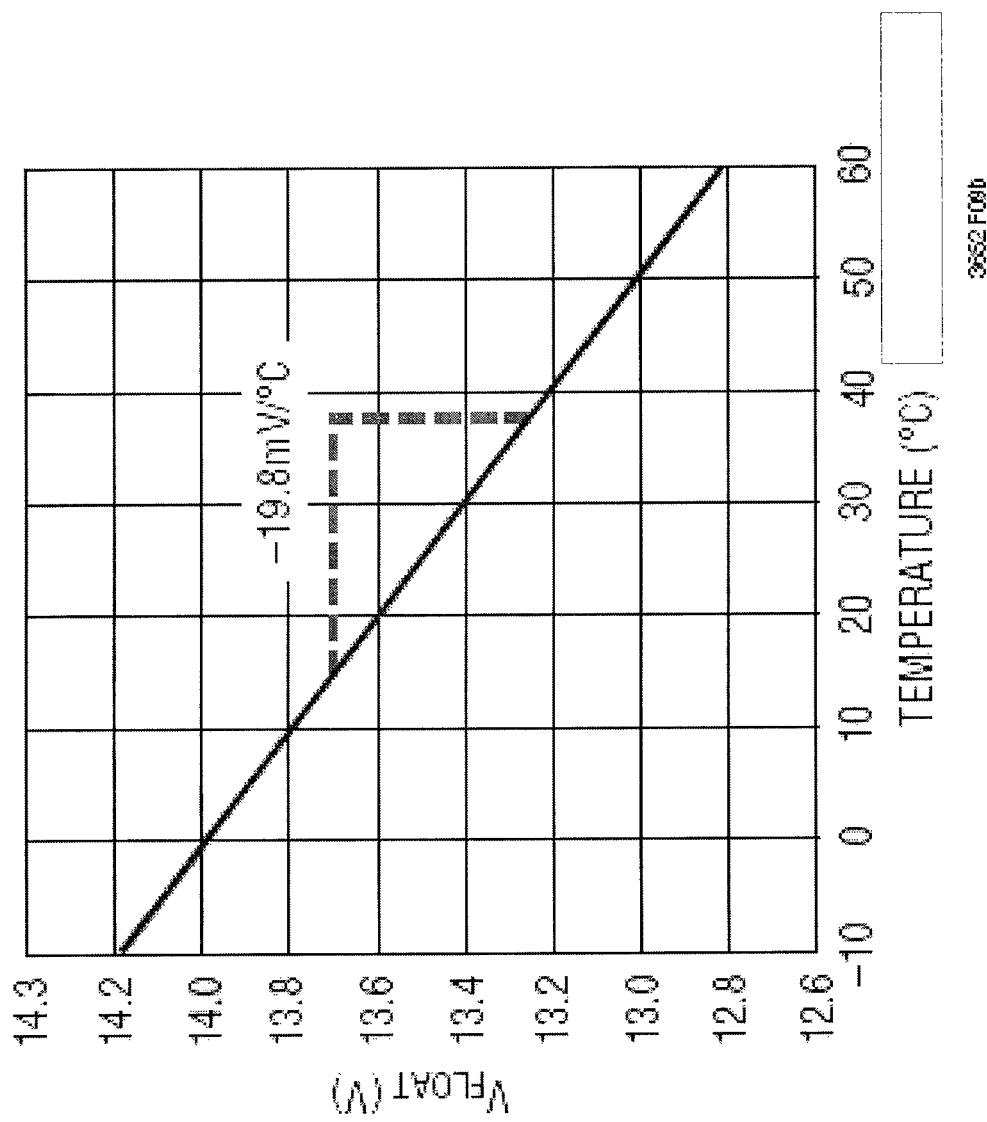
FIG. 10 shows the linear characteristic of a battery float voltage with respect to temperature.
Figure 11:
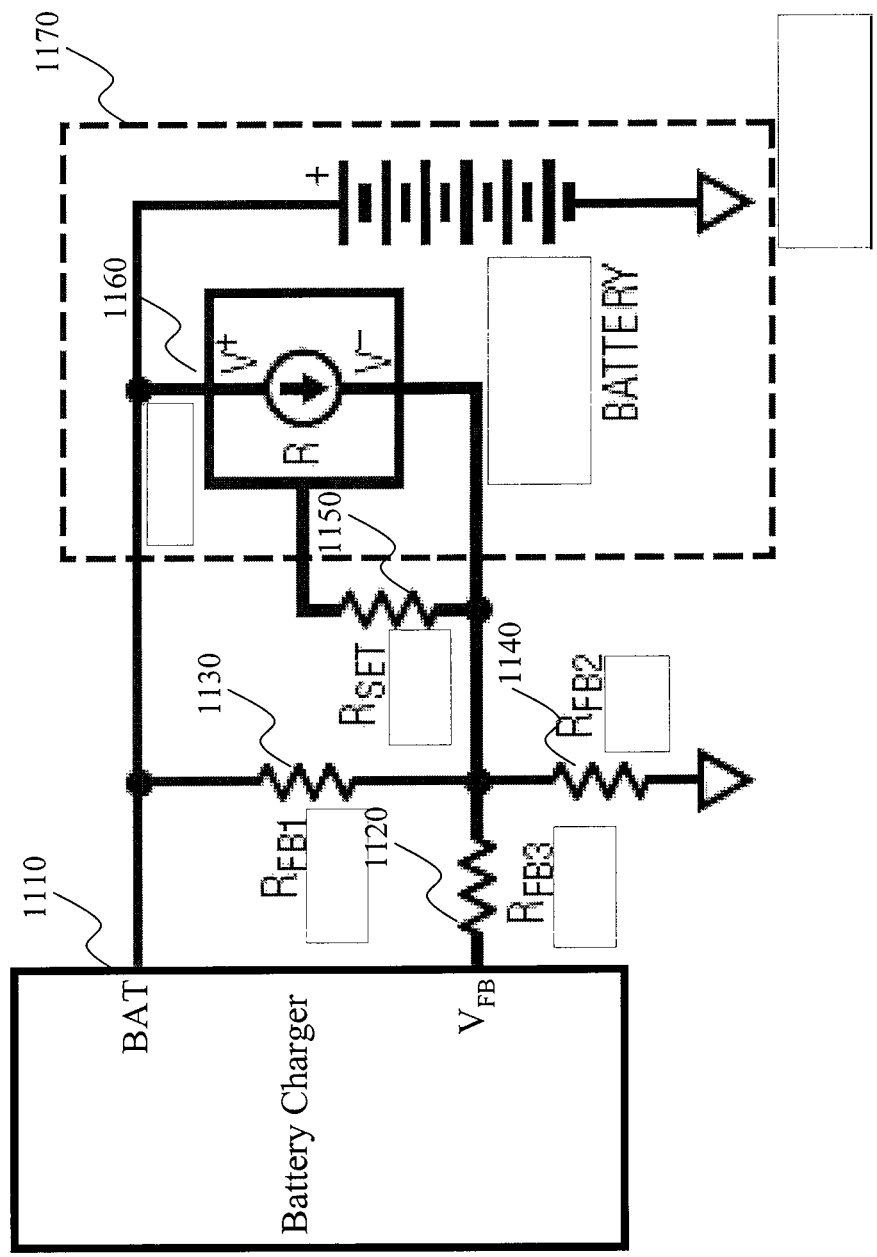
FIG. 11 depicts an exemplary circuit for adjusting the float voltage of a battery charger to achieve optimal energy storage at any temperature, according to an embodiment of the present teaching.

Optimal battery float voltages change with temperature as well. Such change with respect to temperature may be linear or non-linear. FIG. 10 provides a plot where linear change is shown. In FIG. 10, the X-axis represents temperature and the Y-axis represents the value of an optimal battery float voltage. It can be seen that when temperature rises, the optimal battery float voltage drops linearly. To achieve optimal energy storage when the voltage change with respect to temperature change is linear, the PTAT current source as depicted in FIG. 9 can be used to adjust the float voltage of a battery charger in order to achieve optimal energy storage at any temperature. FIG. 11 shows an exemplary circuit to achieve that.

In FIG. 11, the current source 1160 may be implemented within a battery 1170 so that when temperature drops, the current flowing through the current source decreases. Because the amount of current flowing through $R_{FB3}$ is essentially zero, the $V_{FB}$ voltage is also imposed across $R_{FB2}$ making the total current flowing through $R_{FB2}$ constant with temperature. Hence, as the temperature of the PTAT current source changes, which causes current changes through the PTAT current source, the change in current flowing through $R_{FB1}$ needs to be offset by an equal amount but in an opposite direction. Because $V_{FB}$ is fixed, the change in current is accomplished by a change in the BAT float voltage. For example, when the temperature decreases, which results in a decrease in PTAT current, the BAT float voltage must increase to offset the decrease in PTAT current, there by increasing the current in $R_{FB1}$.

The circuits shown in FIGS. 9 and 11 can also be used to implement non-linear PTAT current sources by changing the RSET resistors 930 or 1150 from fixed resistors to Negative Temperature Coefficient (NTC) thermistors. In such an implementation, the current generated by the current sources 940 and 1160 will vary as a direct function of temperature and the non-linear change in the resistance of the RSET NTC thermistor. A typical equation for resistance as a function of temperature (in degrees Celsius) for an NTC thermistor is given by:

$$RNTC(c) = R\_25C * e^{B*((1/(c+273.15))-0.003354)}$$

where R_25 C is the resistance of the NTC resistor at 25 degrees Celsius, B is the beta of the NTC, given by the manufacturer, and c is the temperature of the NTC resistor in degrees Celsius. In circuit as shown in FIG. 9, if the RSET fixed resistor is replaced with such an NTC resistor, the equation for the input regulation voltage as a function of temperature is given by:

$$VIN(c) := V_{IN\_REG} + RIN1 \cdot \left[ \frac{V_{IN\_REG}}{RIN2} - \left[ \frac{2.272 \times 10^{-4} \cdot c + 62.05510^{-3}}{(R\_25C) \cdot e^{B \cdot \left(\frac{1}{c+273.15} - 3.354 \times 10^{-3}\right)}} \right] \right]$$

Figure 12:
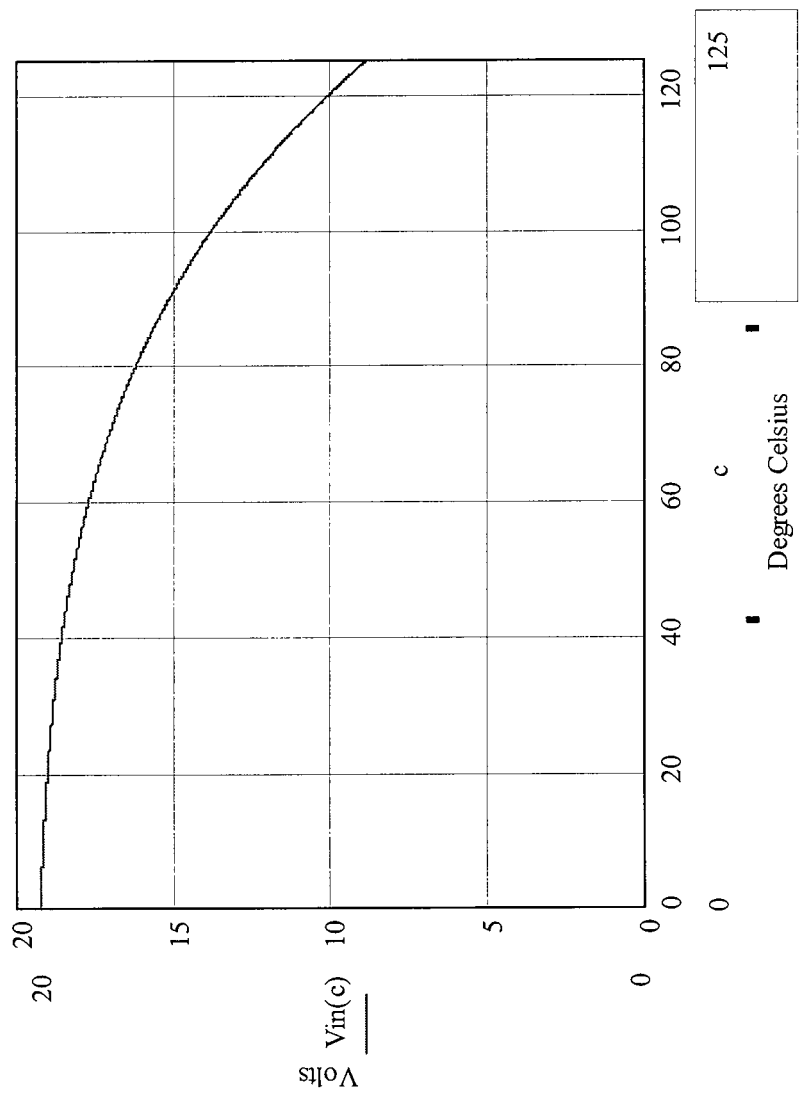
FIG. 12 shows a non-linear input voltage regulation plot, according to an embodiment of the present teaching.

FIG. 12 shows a plot of the equation for $V_{IN}$ as a function of temperature using an NTC as the RSET resistor. The parameters used for this plot were B equals 3380, R_25 C equals 22K Ohms, RIN2 equals 24.3K Ohms, RIN1 equals 150K Ohms and VIN_REG equals 2.7 Volts.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

I claim:

1. A battery charging system comprising:
   a battery configured to be charged;
   a power delivery path configured for delivering power to the battery; and
   an integrated switching battery charger configured for charging the battery by delivering output power to the battery via the power delivery path based on available input power from an input power source, wherein
   the integrated switching battery charger includes an output voltage regulation loop and an input voltage regulation loop, both of which are configured to control the output current flowing out of the integrated switching battery charger to the battery, and
   the input voltage regulation loop is configured to linearly modulate output current of the integrated switching battery charger to regulate an input voltage of the integrated switching battery charger to a prescribed voltage.

2. The system of claim 1, wherein the power delivery path comprises:
   an inductor connected to the output of the integrated switched battery charger and configured to induce the output current from the integrated switched battery charger; and
   a current sensing element coupled with the integrated switched battery charger, configured to monitor current inducted from the inductor.

3. The system of claim 1, wherein the integrated switched battery charger comprises:
   a switched regulation duty cycle control circuit configured for generating a duty cycle to be used to regulate power output from the battery charger;
   a switching element configured for producing the power based on an input power and the duty cycle;
   an output current control circuit coupled with the power delivery path and the switched regulation duty cycle control circuit and configured for controlling the switched regulation duty cycle control circuit based on current flowing into the battery from the power delivery path and a control voltage;
   an output voltage monitor coupled with the battery and configured to generate the control voltage on a charge current control node, output to the output current control circuit, based on a charging battery voltage; and
   an input voltage regulation circuit coupled to the input power source and the charge current control node, configured to modulate the control voltage on the charge current control node based on an input voltage associated with the input power source.

4. The system of claim 1, wherein the integrated switched battery charger comprises:
   a switched regulation duty cycle control circuit configured for generating duty cycle to be used to regulate power output from the battery charger;
   a switching element configured for producing the power based on an input power and the duty cycle;

an output current control circuit coupled with the power delivery path and the switched regulation duty cycle control circuit and configured for controlling the switched regulation duty cycle control circuit based on current flowing into the battery from the power delivery path;

an output voltage monitor coupled with the battery and configured to generate the control voltage on the charge current control node based on a charging battery voltage, where the control voltage is used by the switched regulation duty cycle control circuit to generate the duty cycle; and an input voltage regulation circuit coupled to the input power source and the charge current control node, configured to generate the control voltage on the charge current control node based on an input voltage associated with the input power source.

5. The system of claim 3 or 4, wherein the control voltage produced by the output voltage monitor is generated based on a difference between the charging battery voltage and a first reference voltage.

6. The system of claim 3 or 4, wherein the control voltage produced by the input voltage regulation circuit is generated based on a difference between the input voltage and a second reference voltage.

7. The system of claim 6, wherein the input voltage is obtained via a resistor divider.

8. The system of claim 7, wherein the resistor divider comprises:
a first resistor connected to the input power source on one terminal and coupled with the input voltage regulation circuit on the other terminal; and
a second resistor serially connected to the other terminal of the first resistor and the ground, wherein the input voltage corresponds to the voltage measured at the other terminal of the first resistor.

9. The system of claim 8, wherein the values of the first and second resistors are determined such that the input voltage is at a level that is in a certain relationship with the second reference voltage.

10. The system of claim 8, wherein the resistor divider is further coupled to a current source that is proportional to absolute temperature (PTAT) at a mid-point of the resistor divider.

11. The system of claim 10, wherein the PTAT current source provides a current that changes in proportion to temperature.

12. The system of claim 11, wherein the current from the PTAT current source is injected into the resistor divider and configured to compensate for temperature variation.

13. The system of claim 6, wherein
the input source is a solar panel,
the second reference voltage corresponds to a maximum power voltage of the solar panel, and
the input voltage regulation circuit is configured to linearly modulate the control voltage based on the difference between the input voltage and the second reference voltage to regulate the input voltage to the maximum power voltage.

14. The system of claim 1, wherein
the input source is a solar panel, and
the prescribed voltage corresponds to a maximum power voltage of the solar panel.

15. The system of claim 1, wherein the input voltage is obtained via a resistor divider.

16. A battery charging system comprising:
a battery configured to be charged;
a power delivery path configured for delivering power to the battery; and
an integrated switching battery charger configured for charging the battery by delivering output power to the battery via the power delivery path based on available input power from an input power source, wherein
the integrated switching battery charger includes an output voltage regulation loop and an input voltage regulation loop, both of which are configured to control the output current flowing out of the integrated switching battery charger to the battery,
the input voltage regulation loop is capable of regulating the input voltage in accordance with the temperature characteristics of the input power source so as to allow for peak power operation at any temperature, and
the input voltage regulation loop is further configured to linearly modulate output current of the integrated switching battery charger to regulate an input voltage of the integrated switching battery charger to a prescribed voltage.

17. The system of claim 16, wherein the input power source corresponds to a solar panel.

18. The system of claim 17, further comprising a resistor divider coupled with the input voltage regulation loop.

19. The system of claim 18, wherein the resistor divider comprises:
a first resistor connected to the input power source on one terminal and coupled with the input voltage regulation circuit on the other terminal at a mid-point; and
a second resistor serially connected to the mid-point and ground.

20. The system of claim 19, wherein the resistor divider is further coupled, at the mid-point, to a current source that is proportional to absolute temperature (PTAT).

21. The system of claim 20, wherein the PTAT current source provides a current that changes in proportion with respect to temperature.

22. The system of claim 21, wherein the current from the PTAT current source is injected into the resistor divider.

23. The system of claim 22, wherein regulating the input voltage from the input power source is achieved by programming appropriate values of the first and second resistors based on temperature characteristics of the input power source and the PTAT current source in accordance with formula:

$$V_{MP}(T) = [(Rext1/Rext2) * V_{REF(IN)}/Rext2] - (Rext1 * I_{PTAT}(T))$$

where $I_{PTAT}(T)$ corresponds to temperature coefficient of the PTAT current source at temperature T, Rext1 represents a value of the first resistor, Rext2 represents a value of the second resistor, $V_{REF(IN)}$ represents a reference voltage used by the input voltage regulation loop, and $V_{MP}(T)$ corresponds to an optimal peak power point of the input power source at temperature T.

24. The system of claim 16, wherein
the input source is a solar panel, and
the prescribed voltage corresponds to a maximum power voltage of the solar panel.

25. The system of claim 16, wherein the input voltage is obtained via a resistor divider.

* * * * *